United States Patent [19]

Yoshimoto

[11] Patent Number: 4,570,223
[45] Date of Patent: Feb. 11, 1986

[54] CASH REGISTER CONTROL SYSTEM FOR AUTHORIZATION OF SELECTED OPERATOR FUNCTIONS

[75] Inventor: Taketoshi Yoshimoto, Ikoma, Japan

[73] Assignee: Sharp Kabushiki Kaisha, Osaka, Japan

[21] Appl. No.: 196,019

[22] Filed: Oct. 10, 1980

[30] Foreign Application Priority Data

Oct. 12, 1979 [JP] Japan .............................. 54-132115
Oct. 12, 1979 [JP] Japan .............................. 54-132116

[51] Int. Cl.[4] ............................................. G06F 15/21
[52] U.S. Cl. ................................... 364/405; 364/900; 340/825.31; 340/825.33; 340/825.34
[58] Field of Search ... 364/200 MS File, 900 MS File, 364/404, 405; 340/825.31, 825.33, 825.34

[56] References Cited

U.S. PATENT DOCUMENTS

| | | | |
|---|---|---|---|
| 3,790,957 | 2/1974 | Dukes et al. | 340/149 R |
| 3,916,386 | 10/1975 | Teixeira | 364/900 |
| 3,937,925 | 2/1976 | Boothroyd | 235/61.7 B |
| 3,941,377 | 3/1976 | Voss et al. | 235/61.7 B |
| 3,946,220 | 3/1976 | Brobeck et al. | 235/168 |
| 4,003,030 | 1/1977 | Takagi et al. | 364/405 |
| 4,023,161 | 5/1977 | Sasaki | 340/365 R |
| 4,051,349 | 9/1977 | Englund | 235/130 R |
| 4,138,733 | 2/1979 | Tadakuma | 364/900 |
| 4,194,176 | 3/1980 | Fukuma | 340/825.35 |
| 4,220,991 | 9/1980 | Hamano et al. | 364/405 |
| 4,231,511 | 11/1980 | Campanella et al. | 235/375 |
| 4,245,311 | 1/1981 | Nakamura | 364/405 |
| 4,310,885 | 1/1982 | Azcua | 364/405 |
| 4,319,326 | 3/1982 | Uchida | 364/900 |
| 4,360,872 | 11/1982 | Suzuki et al. | 364/405 |
| 4,471,434 | 9/1984 | Iwawaki | 364/405 |
| 4,481,599 | 11/1984 | Ootsuka | 364/710 |
| 4,485,441 | 11/1984 | Nakatani et al. | 364/405 |

Primary Examiner—James D. Thomas
Assistant Examiner—A. Wiliams
Attorney, Agent, or Firm—Birch, Stewart, Kolasch & Birch

[57] ABSTRACT

An electronic cash register includes a clerk identifying system, wherein the clerk who handles the electronic cash register must be first registered before initiating the actual registration operation. An operation ability determination circuit is provided for determining whether specific operations can be performed by a specific clerk. When the system is preset not to perform, for example, the defrayment operation when the clerk "A" handles the electronic cash register, the defrayment key is disabled when the clerk "A" handles the electronic cash register.

6 Claims, 3 Drawing Figures

CASH REGISTER CONTROL SYSTEM FOR AUTHORIZATION OF SELECTED OPERATOR FUNCTIONS

BACKGROUND AND SUMMARY OF THE INVENTION

The present invention relates to an electronic cash register and, more particularly, to an electronic cash register which includes an administration system for identifying each cashier or clerk.

An electronic cash register has been developed which includes an administration system for enabling a clerk by clerk checking operation. In such a system, the clerk, who handles the electronic cash register, is first registered in the system before initiating the actual registration operation, and the totaling operation is performed for each clerk. A typical construction of an electronic cash register including the above-mentioned administration system is disclosed in U.S. Pat. No. 4,194,176 (DOS No. 2,846,527), "CASHIER IDENTIFYING ADMINISTRATION IN AN ELECTRONIC CASH REGISTER", issued on Mar. 18, 1980 and assigned to the same assignee as the present application.

However, the above-mentioned conventional electronic cash register allows each clerk to perform a fixed number of operations even when the clerk changes. It is desirable to change the operations which are enabled depending on the clerk who handles the electronic cash register.

Accordingly, an object of the present invention is to provide an electronic cash register which enables different operations depending on the clerk.

Another object of the present invention is to provide a preset system in an electronic cash register for presetting the operations to be enabled in the clerk by clerk fashion.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, operations associated with specific keys, for example, a registration cancel key, a defrayment key and an administration key are precluded through the use of an operation inhibit circuit. A preset system is provided for selectively enabling the operation inhibit circuit depending on the clerk who is handling the electronic cash register. For example, a clerk "A" can perform the registration cancel operation, the defrayment operation and the administration operation. However, when the clerk "B" handles the electronic cash register, the administration operation cannot be conducted even when the administration key is actuated.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
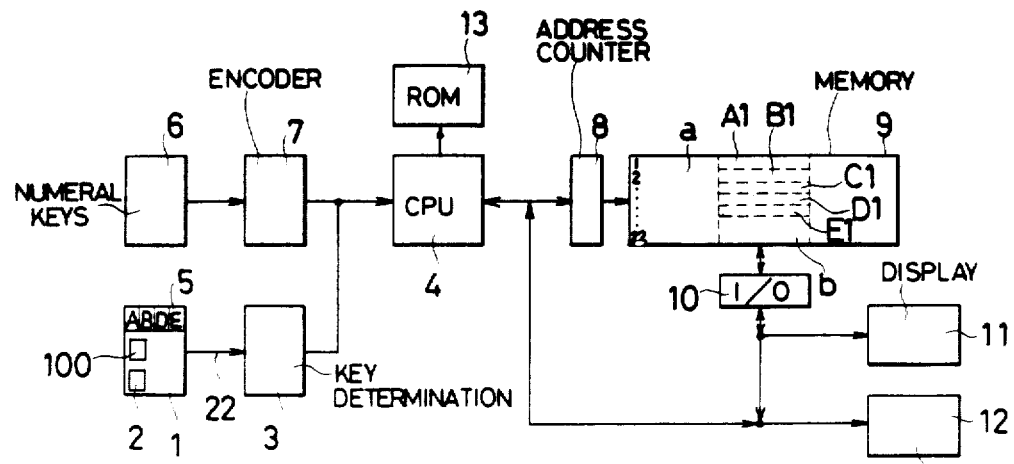
FIG. 1 is a block diagram of a general construction of an electronic cash register.

FIG. 1 shows a general construction of an electronic cash register which includes a clerk identifying system for totaling the merchandise information in the clerk by clerk fashion.

To perform the normal registration operation, a mode key 2 included in function keys 1 is inclined to the normal registration mode. The mode key actuation is detected by a key determination circuit 3 which develops a control signal toward a central processor unit 4 in order to place the electronic cash register in the normal registration mode.

Thereafter, any one of clerk key switches 5 is actuated to indicate the clerk who handles the electronic cash register. When, for example, the clerk "A'" handles the electronic cash register, a clerk key switch "A" is actuated to introduce a control signal, which indicates that the clerk is "A'", into the central processor unit 4 through the key determination circuit 3. The clerk key switches 5 are associated with a lock key assigned to each clerk so that the clerk key switches other than the clerk key switch "A" can not be operated when the clerk "A'" handles the electronic cash register. A typical construction of the clerk identifying system is disclosed in U.S. Pat. No. 4,194,176 "CASHIER IDENTIFYING ADMINISTRATION IN AN ELECTRONIC CASH REGISTER", issued on Mar. 18, 1980 and assigned to the same assignee as the present application. In the normal registration operation, numeral information such as money information related to each transaction is introduced from numeral keys 6 into the central processor unit 4 through a key encoder 7. Then, a predetermined function key, such as a department key, included in the function keys 1 is actuated to indicate the kind of transaction through the key determination circuit 3. The numeral information is introduced into and stored in a desired memory section in a memory block "a" of a memory 9 through the use of an address counter 8 and an input/output circuit 10. The numeral information is displayed on a display unit 11 and printed on a receipt slip and/or a journal paper through the use of a printer 12.

When the registration operation related to one customer is completed, a total key 100 included in the function keys 1 is actuated. In response to the actuation of the total key 100, the central processor unit 4 functions to read out the entire information stored in the memory block "a" of the memory 9 via the input/output circuit 10, and to total the money information. The total money information is introduced into and stored in a memory block "b", which stores the total accumulated money information for one day, and introduced into and stored in a memory block "$A_1$" which corresponds to the clerk "A'". In addition, the total money information is displayed on the display unit 11 and printed on the receipt bill and/or the journal paper through the use of the printer 12. When the clerk "B'" handles the electronic cash register, the clerk key switch "B" is actuated, and the total money information is accumulated in the memory block "b" and in a memory block "B₁" of the memory 9. The above discussed operations are controlled by programs stored in a read only memory 13.

Figure 2:
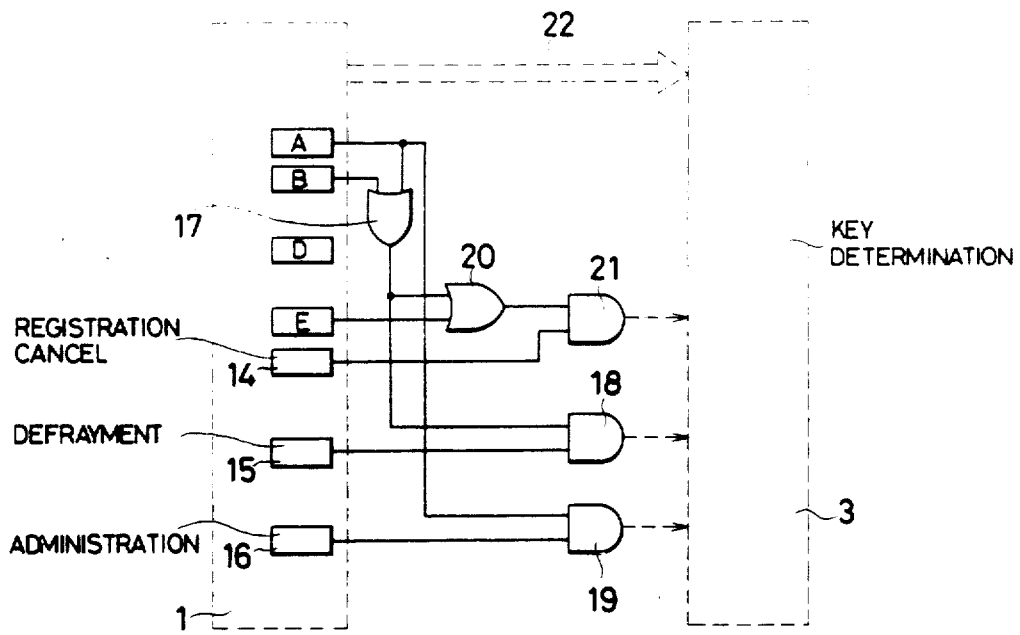
FIG. 2 is a block diagram of an essential part of an embodiment of an electronic cash register of the present invention.

In the conventional electronic cash register, the operations enabled for use by the teller or operation ability are fixed without regard to the experience and reliability of the clerk who handles the electronic cash register. However, it is desirable to change the operation ability when the clerk changes. FIG. 2 shows an essential part of an embodiment of an electronic cash register of the present invention, wherein a specific operation may be enabled only by a specific clerk. Like elements corresponding to those of FIG. 1 are indicated by like numerals.

More specificaly, in the electronic cash register of FIG. 2, operations related to a registration cancel key 14, which is used for cancelling the registration information when the commodity, once sold, is sent back, a defrayment key 15, which is used for defraying money, and an administration key 16, which is used for checking the business condition may be selectively enabled depending on the clerk who handles the electronic cash register. In this example, the clerk "A'" can operate the registration cancel key 14, the defrayment key 15 and the administration key 16. The clerk "B'" can operate the registration cancel key 14 and the defrayment key 15, but can not operate the administration key 16. The clerk "D'" can operate neither one of the registration cancel key 14, the defrayment key 15 and the administration key 16. The clerk "E'" can operate only the registration cancel key 14.

The clerk key switch "A" assigned to the clerk "A" is connected to an OR gate 17 and an AND gate 19. The OR gate 17 is connected to an AND gate 21 via an OR gate 20, and to an AND gate 18. Accordingly, when the clerk key switch "A" is held in the actuated condition, the clerk key switch "A" being held in the actuated condition when the clerk "A'" handles the electronic cash register, the AND gates 18, 19 and 21 are held in the conductive condition. Therefore, when any one of the registration cancel key 14, the defrayment key 15 and the administration key 16 is actuated by the clerk "A'", the corresponding key code signal is introduced into the key determination circuit 3.

When the clerk key switch "B" corresponding to the clerk "B" is held in the actuated condition by the clerk "B'", the AND gates 18 and 21 are held in the conductive condition, but the AND gate 19 is held in the non-conductive condition. Accordingly, a key code signal is applied to the key determination circuit 3 when the registration cancel key 14 or the defrayment key 15 is actuated. However, the electronic cash register performs no operation even when the administration key 16 is actuated.

When the clerk "D'" handles the electronic cash register, the AND gates 18, 19 and 21 are held in the non-conductive condition. Accordingly, the registration cancel key 14, the defrayment key 15 and the administration key 16 can not perform their associated operations. When the clerk key switch "E" is held in the actuated condition by the clerk "E'", the AND gate 21 is held in the conductive condition via the OR gate 20. Therefore, when the registration cancel key 14 is actuated by the clerk "E'", the corresponding key code signal is applied to the key determination circuit 3 through the AND gate 21. However, the defrayment key 15 and the administration key 16 are inoperative because the AND gates 18 and 19 are held in the non-conductive condition. The remaining function keys are connected to the key determination circuit 3 through a signal line 22.

Figure 3:
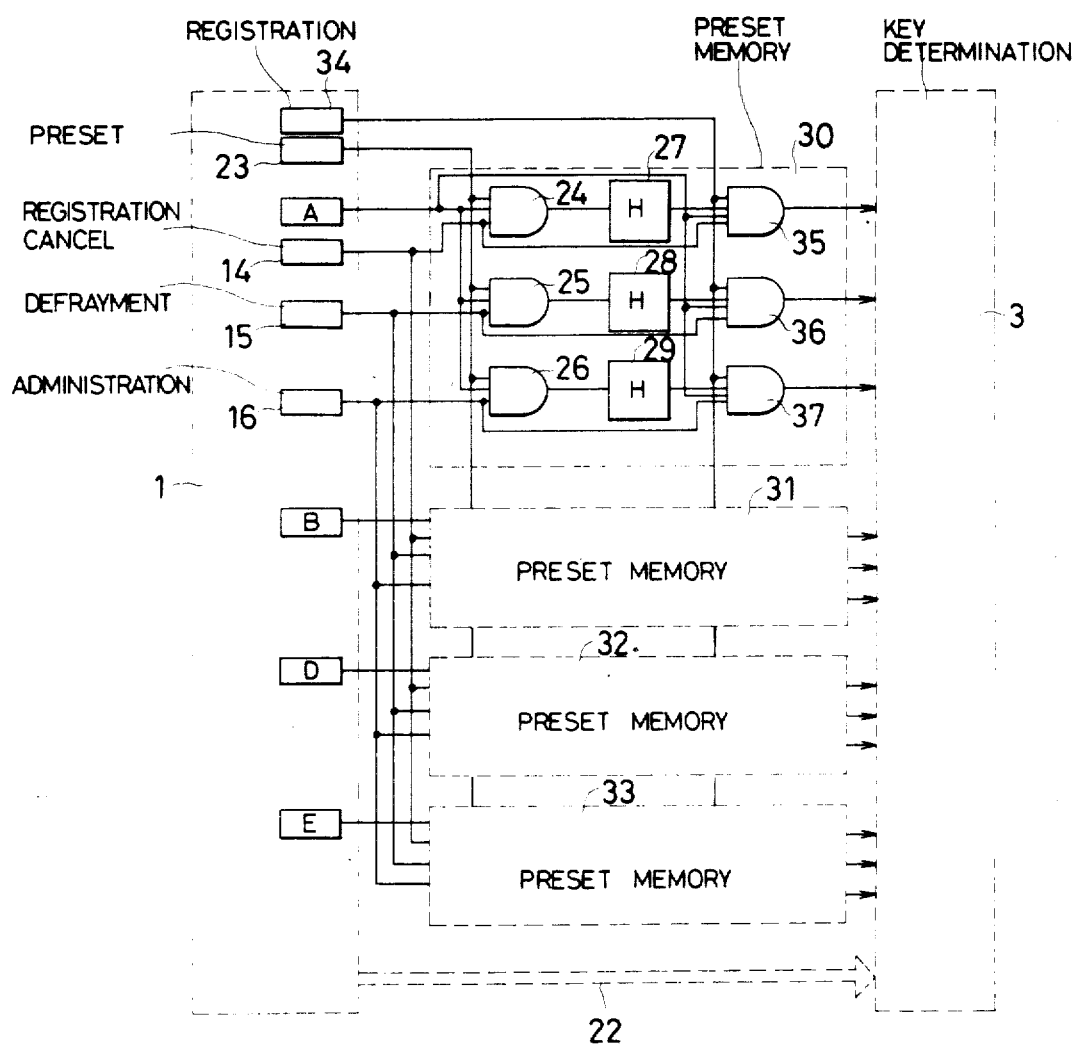
FIG. 3 is a block diagram of an essential part of another embodiment of an electronic cash register of the present invention.

In the embodiment of FIG. 2, the operation ability selection can not be changed at manager's choice. FIG. 3 shows an essential part of another embodiment of an electronic cash register of the present invention, wherein the operation ability selection is presettable by the manager. Like elements correspondig to those of FIG. 2 are indicated by like numerals.

To preset the operation ability selection, a preset key 23 is actuated by the manager to place the electronic cash register in the preset mode. In response to the actuation of the preset key 23, AND gates 24, 25 and 26 receive a signal of the logic "1" at one input terminal thereof. Then, the clerk key switch "A" is actuated to make the AND gates 24, 25 and 26 conductive in order to select the allowed operation for the clerk "A'". If the operations related to the registration cancel key 14, the defrayment key 15 and the administration key 16 are desired to be performed by the clerk "A'", the registration cancel key 14 is first actuated to apply the corresponding key signal to a state holding circuit 27, for example, a flip-flop circuit, through the AND gate 24. In this way, the state holding circuit 27 is set in the logic "1". In a same manner, a state holding circuit 28 corresponding to the defrayment key 15 is set in the logic "1" by the defrayment key 15 via the conductive AND gate 25. Another state holding circuit 29 corresponding to the administration key 16 is also set in the logic "1" by the administration key 16 via the conductive AND gate 26.

In this way, the operation ability selection for the clerk "A'" is preset in a preset memory 30. If the operation related to the administration key 16 is not to be performed by the clerk "A'", the administration key 16 should not be actuated, thereby setting the logic "0" in the state holding circuit 29.

The above-mentioned preset operation is repeated for the clerks "B'", "D'" and "E'" to preset the operation ability selection in preset memories 31, 32 and 33, respectively. The preset memories 31, 32 and 33 have the same construction as the preset memory 30. When the preset operation is completed, the preset key 23 is again actuated to release the preset mode. Under this actuation, the AND gates 24, 25 and 26 are held in the non-conductive condition.

Now assume that the normal registration operation is performed by the clerk "A'". A registration key 34 is depressed, and the clerk key switch "A" is depressed. Since the logic "1" is stored in the state holding circuits 27, 28 and 29, AND gates 35, 36 and 37 are placed in the conductive condition. Therefore, if the registration cancel key 14 is actuated by the clerk "A'", the corresponding key code signal is applied from the AND gate 35 to the key determination circuit 3. When the defrayment key 15 is actuated by the clerk "A'", the corresponding key code signal is applied from the AND gate 36 to the key determination circuit 3. When the administration key 16 is actuated by the clerk "A'", the corresponding key code signal is applied from the AND gate 37 to the key determination circuit 3 in order to instruct the administration operation to the central processor unit 4.

If the logic "0" is preset in the state holding circuit 29, the key code signal is not developed from the AND gate 37 even when the administration key 16 is actuated. The remaining function keys are connected to the key determination circuit 3 via the signal line 22. Of course, the clerk identifying signal is applied through the signal line 22 in response to actuation of any one of the clerk key switches "A", "B", "D" and "E".

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method of enabling access to a selected one of a plurality of operational functions in an electronic cash register by the clerks authorized to use said cash register, said method comprising:
   identifying the clerk operating said electronic cash register and producing a unique clerk identification signal;
   identifying said selected one of said plurality of operational functions;
   storing authorization information in said electronic cash register related to the operational functions each clerk is authorized to use; and
   enabling said selected one of said operational functions in said electronic cash register only if said authorization information related to said identified clerk stored therein authorizes use of said selected one of said functions by said identified clerk;
   presetting said authorization information stored in said cash register by introduction of said information into a preset register via a keyboard of said cash register.

2. An electronic cash register which selectively enables access to operational functions thereof by the clerks authorized to use said cash register comprising:
   function selection means for enabling a clerk to enter a selected function and for producing a function signal indicative thereof;
   means for identifying the clerk operating said electronic cash register and for developing an identification signal unique to that clerk;
   authorization means for determining only selected operational functions each clerk is authorized to use, said authorization means being responsive to said identification signal to produce enable signals corresponding to said operational functions the identified clerk is authorized to use; and
   function enablement means responsive only to the presence of a corresponding one of said enable signals to pass said function signal produced by said function selection means to said electronic cash register;
   said authorization means including preset register means for selectively storing authorization information including operational functions each clerk is authorized to use, said operational functions stored therein being used by said authorization means to produce said enable signals.

3. The cash register of claim 2 wherein said function enablement means comprises a plurality of AND gates, one said gate dedicated to each function, each said AND gate receiving said function and enable signals at its inputs.

4. The system of claim 2, wherein one of said selected functions is the registration cancelling operation for cancelling already registered transaction data.

5. The cash register of claim 2 further comprising preset means for introducing said authorization information into said preset register means.

6. The cash register of claim 5 wherein said preset register means includes a plurality of state holding circuits, one of said circuits dedicated to each combination of a clerk identification signal and one of said operational functions.

* * * * *